US011417194B2

(12) United States Patent
Maeda et al.

(10) Patent No.: US 11,417,194 B2
(45) Date of Patent: Aug. 16, 2022

(54) HAND WASHING SUPPORTING DEVICE, METHOD AND PROGRAM (71) Applicant: Nippon Telegraph and Telephone Corporation, Tokyo (JP)

(72) Inventors: Atsuhiko Maeda, Tokyo (JP); Midori Kodama, Tokyo (JP); Motonori Nakamura, Tokyo (JP); Ippei Shake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/255,649

(22) PCT Filed: Jun. 25, 2019

(86) PCT No.: PCT/JP2019/025196
§ 371 (c)(1),
(2) Date: Dec. 23, 2020

(87) PCT Pub. No.: WO2020/004400
PCT Pub. Date: Jan. 2, 2020

(65) Prior Publication Data
US 2021/0287520 A1 Sep. 16, 2021

(30) Foreign Application Priority Data
Jun. 29, 2018 (JP) .............................. JP2018-124724

(51) Int. Cl.
*G08B 21/24* (2006.01)
*G06F 3/01* (2006.01)
*G08B 5/22* (2006.01)

(52) U.S. Cl.
CPC ........... *G08B 21/245* (2013.01); *G06F 3/017* (2013.01); *G08B 5/22* (2013.01)

(58) Field of Classification Search
CPC ......... G08B 21/245; G08B 5/22; G06F 3/017; A61H 35/00
See application file for complete search history.

(56) References Cited

U.S. PATENT DOCUMENTS

| 2009/0164219 | A1* | 6/2009 | Yeung | G06F 3/01 704/258 |
| 2018/0122214 | A1 | 5/2018 | Freedman et al. | |
| 2018/0293873 | A1* | 10/2018 | Liu | G08B 21/245 |

FOREIGN PATENT DOCUMENTS

| CH | 706634 A | * 12/2013 | ........... A47K 5/1201 |
| CH | 706634 A1 | * 12/2013 | ........... A47K 5/1201 |
| JP | 3133257 | 7/2007 | |

OTHER PUBLICATIONS

PCT International Preliminary Report on Patentability in International Appln. No. PCT/JP2019/025196, dated Dec. 29, 2020, 11 pages (with English Translation).

(Continued)

*Primary Examiner* — Brian Wilson
(74) *Attorney, Agent, or Firm* — Fish & Richardson P.C.

(57) ABSTRACT

A hand washing supporting device according to embodiments is a hand washing supporting device including a processor, in which the processor is configured to perform a detection process that detects, upon detecting the motion of the hand by the user for a predetermined period of time by the detection process, a motion of a hand by a user, a determination process that determines a start of hand washing by the user, and a notification process that notifies, in accordance with a determination of the start of the hand washing by the determination process, the user of a difference between time required from the start to an end of the hand washing by the user and the predetermined period of time.

6 Claims, 8 Drawing Sheets

(56) References Cited

OTHER PUBLICATIONS

Shuzo et al., "Wearable Eating Habit Sensing System Using Internal Body Sound," Journal of Advanced Mechanical Design, Systems, and Manufacturing, 2010, 4(1):158-166.

* cited by examiner

HAND WASHING SUPPORTING DEVICE, METHOD AND PROGRAM

CROSS-REFERENCE TO RELATED APPLICATIONS

This application is a National Stage application under 35 U.S.C. § 371 of International Application No. PCT/JP2019/025196, having an International Filing Date of Jun. 25, 2019, which claims priority to Japanese Application No. 2018-124724, filed on Jun. 29, 2018. The disclosure of the prior application is considered part of the disclosure of this application, and is incorporated in its entirety into this application.

TECHNICAL FIELD

Embodiments of the present invention relate to a hand washing supporting device, method and program.

BACKGROUND ART

Hand washing is a significant practice for hygiene. By hand washing, people can wash off bacteria and viruses attached to the hands and reduce a probability of morbidity to a disease.

Although many people have their own habits of hand washing, for example, after going out, some may not wash hands carefully for a sufficiently long time.

For example, one theory says that hand washing for 30 seconds or more can wash off many bacteria from hands, but many people may not wash their hands for 30 seconds or more as described above. Further, there is a theory that not only palms but between fingers, wrists, and the like should be washed carefully, but people may not wash such different parts.

Although manuals or the like of an appropriate method of hand washing may be distributed from medical agencies or the like, people may not sufficiently read such manuals. Otherwise, people who have read such manuals may forget to be cautious of the appropriate method of hand washing when actually washing hands.

Further, techniques have been developed for wearable devices such as smart watches. For example, a system for sensing a dietary habit of a person wearing a wearable device using the device has been considered (see, for example, Non Patent Literature 1).

CITATION LIST

Non Patent Literature

Non Patent Literature 1: Shuzo, M., et al., "Wearable Eating Habit Sensing System Using Internal Body Sound", Journal of Advanced Mechanical Design, systems, and Manufacturing, Vol. 4, No. 1, 2010, pp. 158 to 166.

SUMMARY OF THE INVENTION

Technical Problem

However, currently, there are no systems that have a function of appropriately supporting hand washing, for example, systems that allow people to be aware of washing hands for a predetermined period of time.

The present invention has been made in view of the above circumstances, and an object of the present invention is to provide a hand washing supporting device, method and program capable of appropriately supporting hand washing.

Means for Solving the Problem

In order to achieve the above object, a first aspect of a hand washing supporting device according to one embodiment of the present invention is a hand washing supporting device including a processor, in which the processor is configured to perform a detection process that detects, upon detecting the motion of the hand by the user for a predetermined period of time by the detection process, a motion of a hand by a user, a determination process that determines a start of hand washing by the user, and a notification process that notifies, in accordance with a determination of the start of the hand washing by the determination process, the user of a difference between time required from the start to an end of the hand washing by the user and the predetermined period of time.

In a second aspect of the hand washing supporting device of the present invention, in the first aspect, the processor is configured so that; the detection process includes detecting accelerations in a plurality of directions representing a motion of the user's hand, and the determination process includes determining the start of hand washing by the user when the accelerations in the plurality of directions detected by the detection process satisfy a condition corresponding to a motion by the user of rubbing palms for the predetermined period of time.

In a third aspect of the hand washing supporting device of the present invention, in the first aspect, the processor is configured so that; the detection process includes detecting accelerations in a plurality of directions representing the motion of the hand by the user at a predetermined sampling period, and the determination process includes determining the start of hand washing by the user when the accelerations in the plurality of directions detected by the detection process a predetermined number of times at the predetermined sampling period satisfy a condition corresponding to a motion by the user of rubbing palms for the predetermined period of time.

In a fourth aspect of the hand washing supporting device of the present invention further including a display apparatus in the first aspect, the processor is configured so that the notification process includes causing the display apparatus to display information for prompting the user to wash hands for time corresponding to a difference between the time required from the start to the end of the hand washing by the user and the predetermined period of time.

In a fifth aspect of the hand washing supporting device of the present invention, in the first aspect, the processor is configured so that; the determination process includes determining, upon detecting the motion of the hand by the user for the predetermined period of time by the detection process, a start of hand washing of palms by the user, and the notification process includes notifying, in accordance with a determination of the start of the hand washing by the determination process, the user of a difference between time required from the start to an end of the hand washing by the user of palms and the predetermined period of time, and notifying time required from a start to an end of hand washing of a part different from the palms after completion of the notification.

One aspect of a method of supporting hand washing according to one embodiment of the present invention is a method of supporting hand washing performed by an apparatus including a processor, the method including detecting, at the processor, upon the processor detecting the motion of the hand by the user for a predetermined period of time, a motion of a hand by a user, determining, at the processor, a start of hand washing by the user, and notifying, at the processor, in accordance with a determination of the start of hand washing at the processor, the user of a difference between time required from the start to the end of hand washing by the user and the predetermined period of time.

One aspect of a hand washing support processing program according to one embodiment of the present invention causes the processor included in the hand washing supporting device to perform the processes performed by the hand washing supporting device described in any one of the first to fifth aspects.

Effects of the Invention

In a first aspect of the hand washing supporting device according to one embodiment of the present invention, a start of hand washing by a user is determined and time from this determination to an end of the hand washing is notified. Thus, the time required for hand washing can be appropriately notified.

In a second aspect of the hand washing supporting device according to one embodiment of the present invention, the start of hand washing by the user is determined when accelerations in a plurality of directions representing the motion of the hand by the user satisfy a condition corresponding to a motion by the user of rubbing palms for a predetermined period of time. Thus, the start of hand washing can be appropriately determined.

In a third aspect of the hand washing supporting device according to one embodiment of the present invention, the accelerations in the plurality of directions representing the motion of the user's hand is detected at a predetermined sampling period, and when the number of times of the detection reaches a predetermined number of times, it is determined whether a pattern of accelerations in the plurality of directions representing the motion of the hand satisfies a condition corresponding to the motion by the user of rubbing palms. This can reduce a frequency of the determination.

In a fourth aspect of the hand washing supporting device according to one embodiment of the present invention, information is displayed on a display apparatus to continue hand washing for time corresponding to a difference between the time required from the start to the end of hand washing and the predetermined period of time from the start to the determination of hand washing. Thus, the time for which the hands should be washed can be appropriately notified.

In a fifth aspect of the hand washing supporting device according to one embodiment of the present invention, the user is notified of the difference between the time required from the start to the end of hand washing and the predetermined period of time from the start to the determination of hand washing, and after the notification, is notified of time required from a start to an end of hand washing of a part different from the palms. Thus, hand washing can be more appropriately supported.

That is, the present invention enables an appropriate support for hand washing.

DESCRIPTION OF EMBODIMENTS

Hereinafter, one embodiment of the present invention will be described below with reference to the drawings.

Overview of Embodiments

In one embodiment of the present invention, by using a wristwatch device, such as a smart watch, that people (hereinafter the users) wear in everyday life, a hand washing supporting device determines a start of hand washing by a user wearing the device. Then, after this determination, the hand washing supporting device supports hand washing such that anyone can easily and properly wash hands by notifying the user that the user should wash hands for a sufficiently long time.

Further, in one embodiment of the present invention, the hand washing supporting device notifies the user that the hand washing should continue for a predetermined period of time for each part of the user's hands to be washed.

First Embodiment

Hereinafter, a first embodiment according to the present invention will be described.

Figure 1:
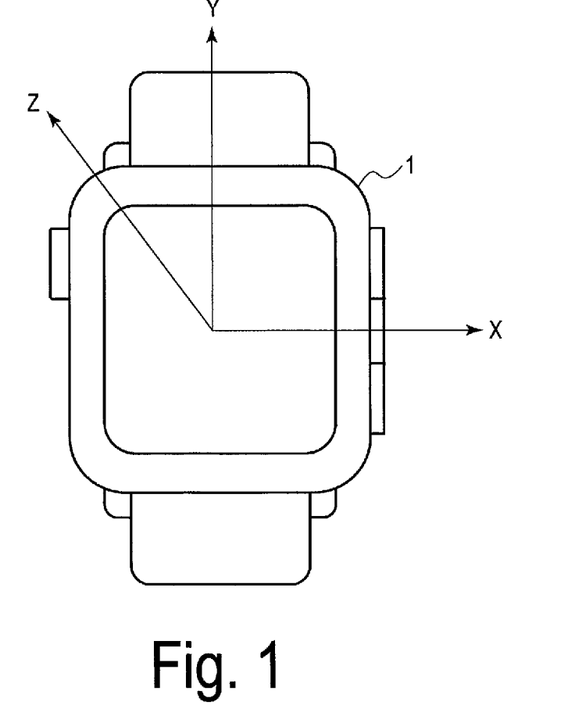
FIG. 1 is a diagram illustrating an example of a smart watch to which a hand washing supporting device according to a first embodiment of the present invention is applied.
Figure 2:
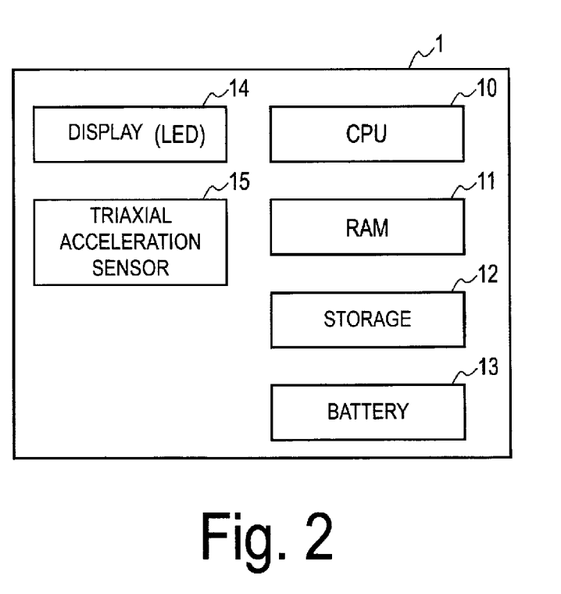
FIG. 2 is a block diagram illustrating a configuration example of the smart watch to which the hand washing supporting device according to the first embodiment of the present invention is applied.

FIG. 1 is a diagram illustrating an example of a smart watch to which a hand washing supporting device according to a first embodiment of the present invention is applied. FIG. 2 is a block diagram illustrating a configuration example of the smart watch to which the hand washing supporting device according to the first embodiment of the present invention is applied.

In this embodiment, a hand washing supporting device is achieved by a system using a computer device that is installed in a smart watch 1 worn by a user to execute a program.

In the example illustrated in FIG. 2, the smart watch 1 has a central processing unit (CPU) 10, which is an example of a general-purpose hardware processor, a random access memory (RAM) 11, a storage 12, a battery 13, a display 14, and a triaxial acceleration sensor 15. The CPU 10 is responsible for the overall processing operation of the smart watch 1.

The RAM 11 and the storage 12 are connected to the CPU 10. The RAM 11 is used as a working memory by the CPU 10. The RAM 11 includes a volatile memory such as a synchronous dynamic random access memory (SDRAM).

The storage 12 is configured by a storage device having a storage medium using a non-volatile memory capable of writing and reading at any time. The non-volatile memory is, for example, a hard disk drive (HDD) or a solid state drive (SSD). The storage 12 stores various programs including processing programs by the CPU 10, and various data in processing by the CPU 10.

Each program stored in storage 12 includes computer-executable instructions. The programs (computer-executable instructions), when executed by the CPU 10, cause the CPU 10 to perform a predetermined process. For example, the programs to implement functions of units in the smart watch 1, when executed by the CPU 10, cause the CPU 10 to perform a series of processes described about the units in the smart watch 1.

The battery 13 generates power to drive the units in the smart watch 1. The display 14 may be achieved by, for example, a liquid crystal display (LED) or an electronic display.

The triaxial acceleration sensor 15 detects accelerations in X-axis direction (horizontal direction), Y-axis direction (horizontal direction, and a direction orthogonal to the X-axis direction), and Z-axis direction (vertical direction) shown in FIG. 1. The arrow directions shown in FIG. 1 are positive axial directions.

Figure 3:
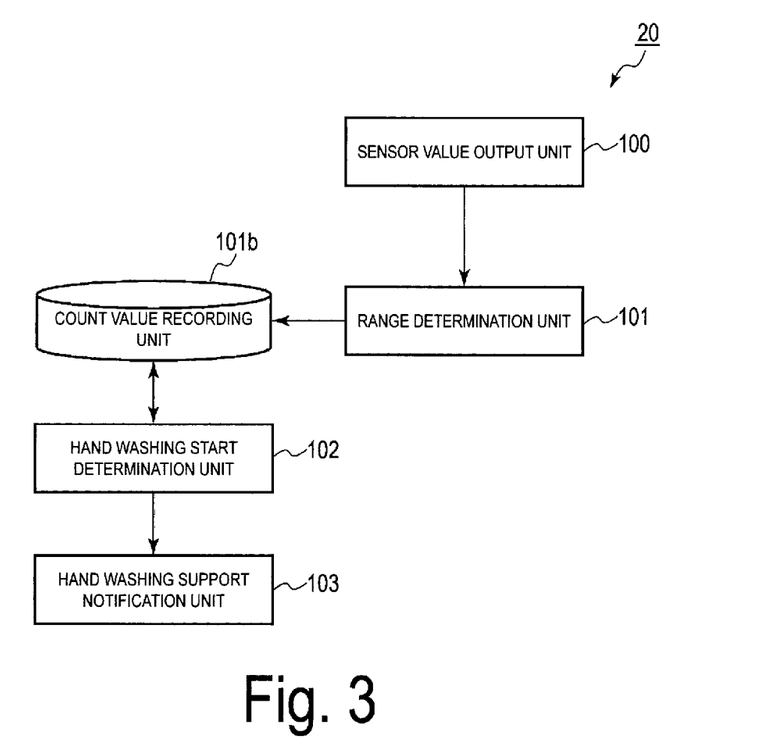
FIG. 3 is a functional block diagram illustrating an example of the hand washing supporting device according to the first embodiment of the present invention.

FIG. 3 is a functional block diagram illustrating an example of the hand washing supporting device according to the first embodiment of the present invention.

As illustrated in FIG. 3, the hand washing supporting device 20 achieved by the smart watch 1 has a sensor value output unit 100, a range determination unit 101, a count value recording unit 101b, a hand washing start determination unit 102, and a hand washing support notification unit 103. Details of each unit will be described below.

The functions of the sensor value output unit 100, the range determination unit 101, the hand washing start determination unit 102, and the hand washing support notification unit 103 are achieved, for example, by the CPU 10 reading and executing the programs stored in the storage 12. Some or all of these functions may be achieved by a special purpose processor such as an application specific integrated circuit (ASIC). The count value recording unit 101b is achieved, for example, by the RAM 11 or the storage 12 described above.

Figure 4:
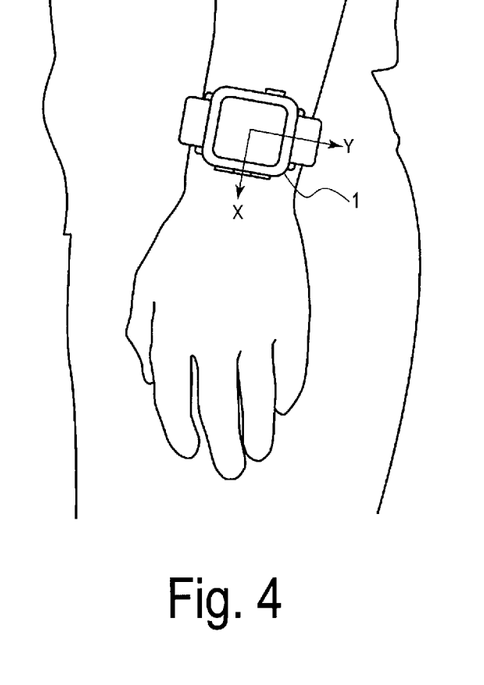
FIG. 4 is a diagram illustrating a first example of how the smart watch is worn.

FIG. 4 is a diagram illustrating a first example of how the smart watch is worn. In the example illustrated in FIG. 4, the user whose forearm is kept downward is wearing the smart watch 1 such that the smart watch 1 is located in the vicinity of the wrist of the left arm and such that a display surface of the display 14 is located on the side of the back of the hand.

The position at which the smart watch 1 is worn is not limited to the vicinity of the wrist as described above as long as the acceleration representing the motion of the hand is detected correctly by the triaxial acceleration sensor 15.

In this embodiment, sensor values indicating accelerations in the X-axis direction detected by the triaxial acceleration sensor 15 (hereinafter, sensor values in the X-axis direction), and sensor values indicating accelerations in the Y-axis direction (hereinafter, sensor values in the Y-axis direction) are mainly used, and sensor values indicating accelerations in the Z-axis direction are not particularly used.

FIG. 4 illustrates the accelerations in X and Y-axis directions (X-axis direction and Y-axis direction) detected by the triaxial acceleration sensor 15 when the user wearing the smart watch 1 leaves the arm downward. The Z-axis direction is omitted from the drawing.

The triaxial acceleration sensor 15 can acquire the sensor values in the X-axis direction and the sensor values in the Y-axis direction at a sampling period of 10 Hz. However, when a program of the hand washing supporting device 20 is activated for every sampling period, the power consumption of the battery 13 of the smart watch 1 has a greater impact on normal use of the smart watch 1.

Thus, in this embodiment, the sensor values acquired at the sampling period are temporarily stored in the RAM 11 or a buffer (not illustrated), and the program of the hand washing supporting device 20 is called only at one sampling per 10 samplings, that is, every one second. This may reduce power consumption of the battery 13 of the smart watch 1.

This program is a program that is driven by a so-called event and is activated only when the program is called. When the program is called, the sensor value output unit 100 collectively receives the sensor values in the X-axis direction and the sensor values in the Y-axis direction detected at 10 samplings from the RAM 11, and stores the sensor values, for example, in storage 12.

Figure 5:
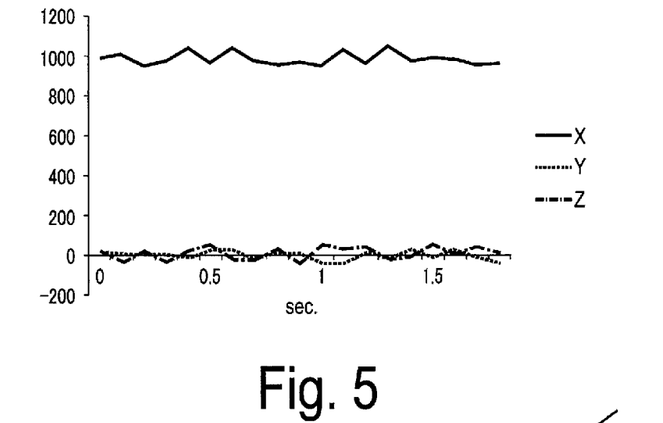
FIG. 5 is a diagram illustrating a first example of sensor values detected by a triaxial acceleration sensor.

FIG. 5 is a diagram illustrating a first example of sensor values detected by the triaxial acceleration sensor.

FIG. 5 illustrates an example of sensor values in the directions including the X and Y-axis directions shown in FIG. 4. In the example shown in FIG. 5, the sensor value in the X-axis direction is about "1,000" when a gravitational acceleration is 1 G and the user leaves the arm down. The sensor values described below are values at a gravitational acceleration of 1 G.

Figure 6:
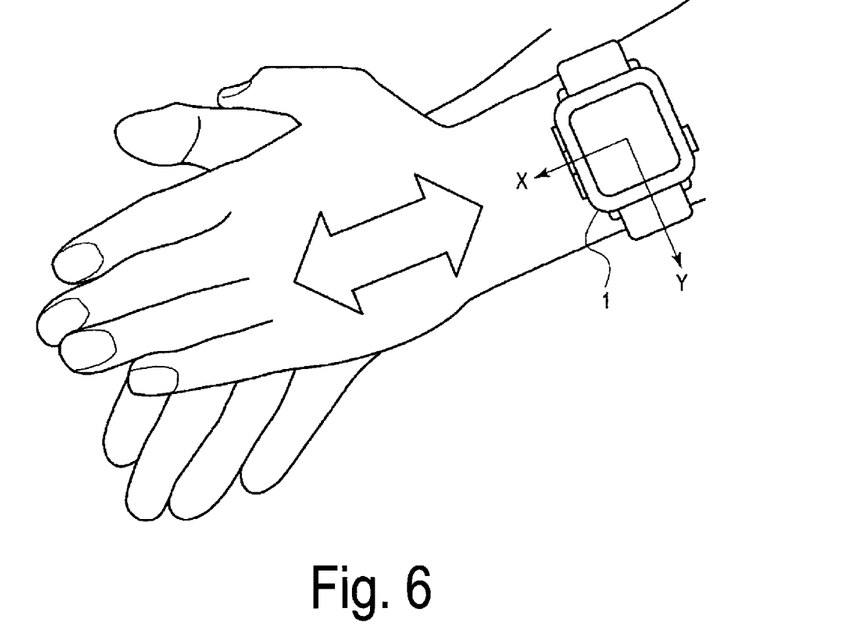
FIG. 6 is a diagram illustrating a second example of how the smart watch is worn.
Figure 7:
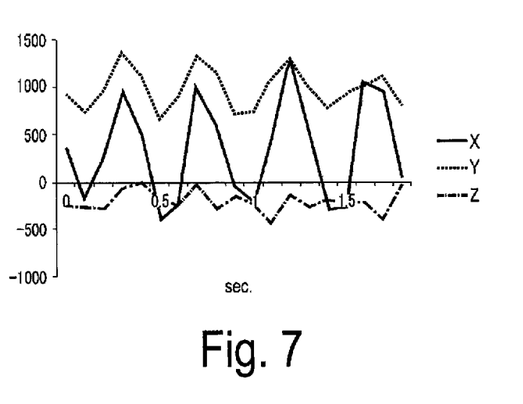
FIG. 7 is a diagram illustrating a second example of sensor values detected by the triaxial acceleration sensor.

FIG. 6 is a diagram illustrating a second example of how the smart watch is worn. FIG. 7 is a diagram illustrating a second example of sensor values detected by the triaxial acceleration sensor.

FIG. 6 shows the acceleration in the X and Y-axis directions detected by the triaxial acceleration sensor 15 of the smart watch 1 when the user is washing hands. The Z-axis direction is omitted from the drawing. FIG. 7 illustrates an example of sensor values in the axial directions including the X and Y-axis directions shown in FIG. 6.

As shown in FIG. 7, when the user is washing hands, the sensor values in the Y-axis direction are positive values, and the sensor values in the X-axis direction particularly greatly vary over time. In this way, while the smart watch 1 is worn in the vicinity of the user's wrist, the triaxial acceleration sensor 15 can detect a motion of the user's hand.

Figure 8:
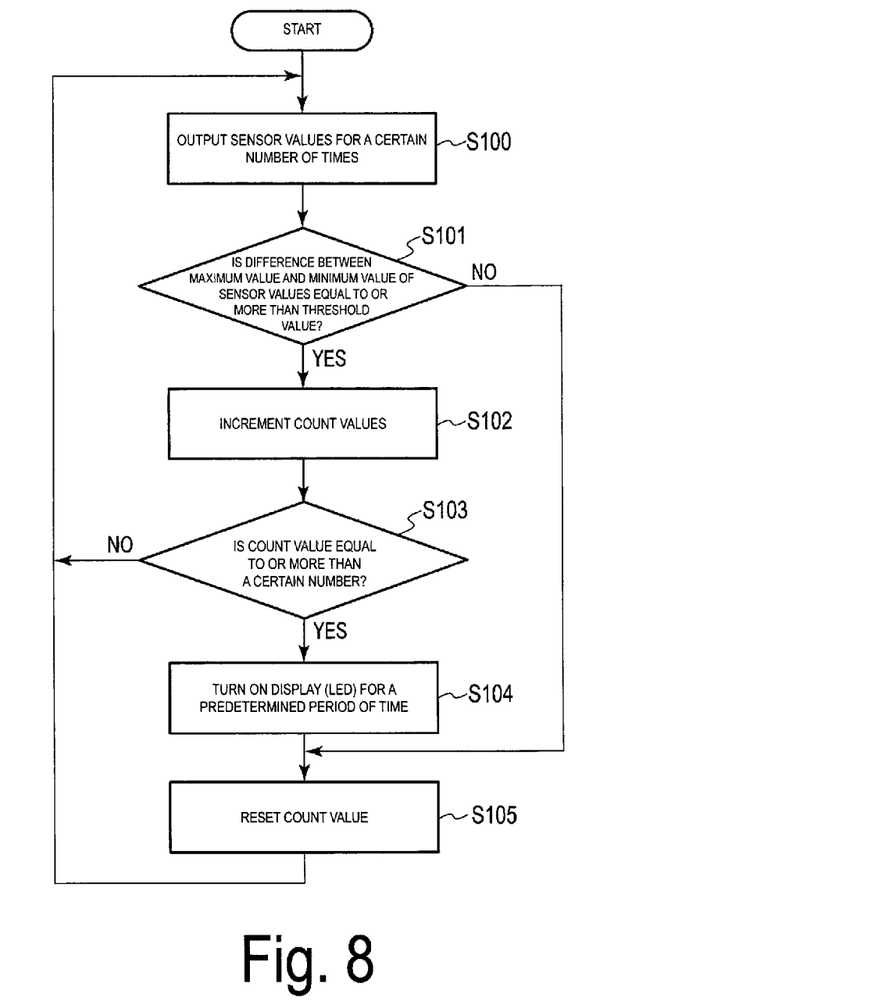
FIG. 8 is a flowchart illustrating an example of processing operations of the hand washing supporting device according to the first embodiment of the present invention.

FIG. 8 is a flowchart illustrating an example of processing operations of the hand washing supporting device according to the first embodiment of the present invention.

When the sensor values detected at 10 samplings in the X-axis direction and the Y-axis direction detected by the triaxial acceleration sensor 15 are stored, for example in the RAM 11, the sensor value output unit 100 outputs these sensor values to the range determination unit 101 (S100).

The sensor values detected at the multiple times of samplings are collectively output to the range determination unit 101, and thus a frequency of the determination by the range determination unit 101 can be reduced. The hand washing supporting device can therefore reduce the power consumption of the battery 13 of the smart watch 1.

The range determination unit 101 determines a start of hand washing by the user based on the sensor value output from the sensor value output unit 100. As shown in FIG. 6, it is assumed that the user starts washing hands with wearing the smart watch 1. At this time, the user rubs both palms.

Thus, when the user rubs both palms, as illustrated in FIG. 7, the sensor values in the Y-axis direction detected by the triaxial acceleration sensor 15 are positive values, and the sensor values in the X-axis direction alternate between the positive and negative values over time, and this alternation is repeated. Thus, the range determination unit 101 performs the following processes in order to detect the start of hand washing by the user.

Specifically, when the range determination unit 101 receives the sensor values detected at 10 samplings from the sensor value output unit 100, the range determination unit 101 determines whether all the sensor values in the Y-axis direction detected at 10 samplings are positive values.

When the sensor values are positive values, the range determination unit 101 determines a maximum value and a minimum value of the sensor values in the X-axis direction detected at the 10 samplings. The range determination unit 101 calculates a difference between the maximum value and the minimum value, and determines whether the difference is equal to or more than a threshold value, for example 1,000 or more (see FIG. 5) (S101).

For example, the sensor values in the X-axis direction detected at 10 sampling are as follows.

[354, −175, 261, 958, 514, −407, −231, 997, 593, −64]

In this case, the maximum value of the sensor values in the X-axis direction is 997, the minimum value of the sensor values in the X-axis direction is −407, the difference between the maximum and minimum values is 1,404, and the difference between the maximum and minimum values exceeds the threshold value of 1,000 described above.

When the difference between the maximum value and the minimum value of the sensor values in the X-axis direction is equal to or more than the threshold value (YES in S101), the range determination unit 101 increments one of count values recorded in the count value recording unit 101b (S102). An initial value of the count value is 0.

Next, the hand washing start determination unit 102 confirms the count values recorded in the count value recording unit 101b.

When the count value is equal to or more than a certain number, for example, equal to or more than three (YES in S103), the hand washing start determination unit 102 determines that a pattern of accelerations in a plurality of directions satisfies a condition corresponding to the user's motion of rubbing palms for a predetermined period of time, that is, that the user has rubbed palms for the predetermined period of time, and determines that the user has started washing hands.

When the sampling period is 10 Hz as described above, the above predetermined period of time is equivalent to three seconds.

On the other hand, when the count value recorded in the count value recording unit 101b is less than a certain number (NO in S103), the processing operation of the hand washing supporting device returns to S100, and the process of S101 is performed based on the sensor value detected at the next sampling period.

In accordance with a determination that the user has started washing hands, the following process is performed to indicate to the user time for which the user should further wash hands after it is determined that the user has started washing hands. Note that the following process is performed to support a sufficiently effective hand washing by the user wearing the smart watch 1.

In this process, the hand washing support notification unit 103 turns on a display by the display 14 of the smart watch 1, for example, by lighting or flashing of a certain color over the above time for which the user should further wash hands (S104).

At this time, the hand washing support notification unit 103 may cause the display 14 to display a message indicating that the user should wash hands. Further, instead of displaying by the display 14, the hand washing support notification unit 103 may notify by outputting a sound from an audio output device (not illustrated) of the smart watch 1.

Here, as described above, it is said that, for the purpose of the user sufficiently carrying out effective hand washing, the user desirably washes hands for 30 seconds or more, that is, the time for which the user should wash hands is desirably 30 seconds or more.

According to this theory, in accordance with a determination of a start of hand washing by the hand washing start determination unit 102 when the user makes a motion of rubbing palms for three seconds, the hand washing support notification unit 103 may turn on the display 14 for the remaining 27 seconds (=30 seconds−3 seconds) at S104.

Further, the hand washing support notification unit 103 may display the time for which the user should further wash hands on the display 14 at S104.

It has been described above that the time for which the user should wash hands is 30 seconds or more. However, this time is one example, and there is a personal difference in the time it takes for the user to wash hands sufficiently and effectively, for example, by a speed at which the user washes hands.

Thus, for example, the hand washing supporting device may store in the storage 12 data of the time it takes for a user who actually wears the smart watch 1 to wash hands sufficiently and effectively, and the hand washing support notification unit 103 may perform the process of S104 based on this time.

After this notification, the hand washing start determination unit 102 resets the count value recorded in the count value recording unit 101b to 0 (S105). The processing is similar (S101→S105) when the difference between the maximum value and the minimum value of the sensor values in the X-axis direction is less than the threshold value at S101 (NO in S101). After S105, the processing operation of the hand washing supporting device returns to S100 and the process of S101 is performed based on the sensor values detected at the next sampling period.

As described above, in the first embodiment of the present invention, the hand washing supporting device notifies the user of the time for which the user should wash hands as information to prompt the user to wash hands in order for the user to wash hands sufficiently and effectively. This can support the user washing hands sufficiently and effectively.

Second Embodiment

Next, a second embodiment of the present invention will be described. Note that, in the second embodiment, detailed descriptions of operations similar to those described in the first embodiment will be omitted.

In the first embodiment, the hand washing supporting device notifies the user of the time for which the user should wash hands in order for the user to wash hands sufficiently and effectively to support hand washing. In contrast, in the second embodiment, the hand washing supporting device supports hand washing more precisely by notifying the user of the time per hand part for which the user should wash each part of the hands.

Figure 9:
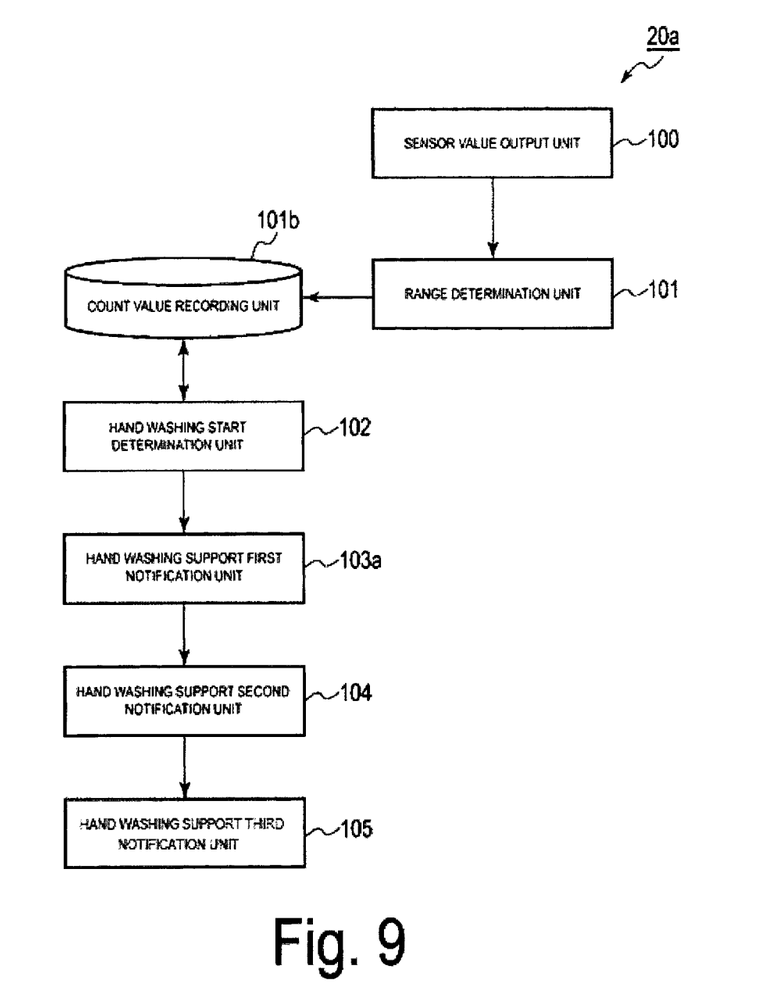
FIG. 9 is a functional block diagram illustrating an example of the hand washing supporting device according to a second embodiment of the present invention.

FIG. 9 is a functional block diagram illustrating an example of the hand washing supporting device according to the second embodiment of the present invention.

In comparison to the hand washing supporting device 20 installed in the smart watch 1 according to the first embodiment shown in FIG. 3, the hand washing supporting device 20a installed in the smart watch 1 according to the second embodiment, as illustrated in FIG. 9, has the following functions instead of the hand washing support notification unit 103 described in the first embodiment. The functions are a hand washing support first notification unit 103a, a hand washing support second notification unit 104, and a hand washing support third notification unit 105. Details of each unit will be described below.

Figure 10:
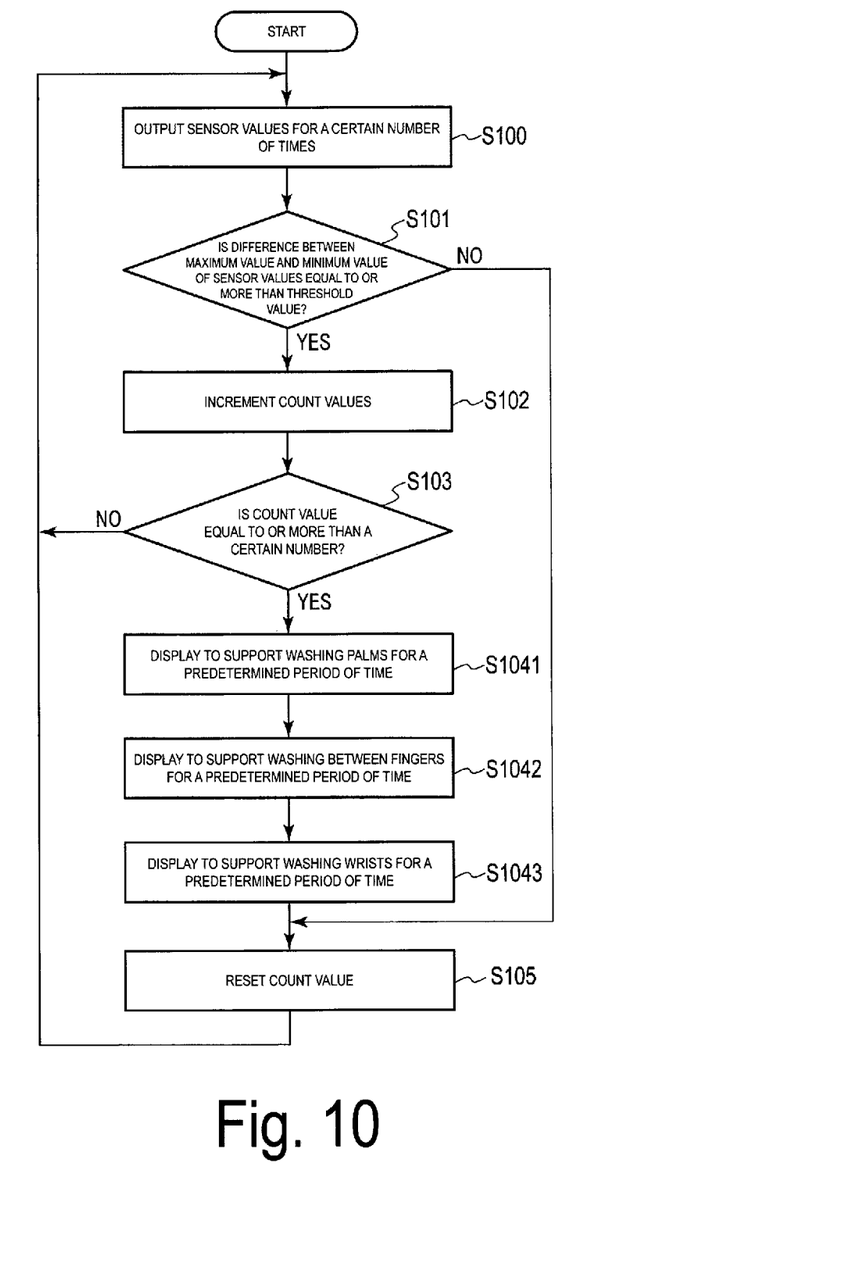
FIG. 10 is a flowchart illustrating an example of processing operations of the hand washing supporting device according to the second embodiment of the present invention.

FIG. 10 is a flowchart illustrating an example of processing operations of the hand washing supporting device according to the second embodiment of the present invention.

First, the processes from S100 to S103 described in the first embodiment (see FIG. 8) are performed. Then, upon the hand washing start determination unit 102 detecting the start of hand washing by the user based on the count value (YES in S103), the processing operation of the hand washing supporting device proceeds to the notification of the time for which the user should further wash the palms in order for the user to wash hands sufficiently and effectively.

In this notification, the hand washing support first notification unit 103a performs a process to encourage the user to wash the palms for a predetermined period of time, in particular to support the user's sufficiently effective hand washing of the palms.

In this process, the hand washing support first notification unit 103a turns on the display by the display 14 for the above predetermined period of time (S1041) such that the user knows the time for which the user should further wash hands with the palms after it is determined that the user has started washing hands.

At this time, the hand washing support first notification unit 103a may cause the display 14 to display a message indicating that the part that the user should wash is the user's palms.

Upon completion of the display in S1041, the hand washing support second notification unit 104 performs a process to encourage the user to wash between the user's fingers for a predetermined period of time, in particular to support the user's sufficiently effective hand washing between fingers.

In this process, the hand washing support second notification unit 104 turns on the display by the display 14 for the above predetermined period of time (S1042) such that the user knows the time for which the user should further wash hands between the fingers after it is determined that the user has started washing the palms.

At this time, the hand washing support second notification unit 104 may cause the display 14 to display a message indicating that the part that the user should wash is between the user's fingers.

Finally, upon completion of the display in S1042, the hand washing support third notification unit 105 performs a process to encourage the user to wash the wrists for a predetermined period of time, in particular to support the user's sufficiently effective hand washing of the wrists.

In this process, the hand washing support third notification unit 105 turns on the display by the display 14 for the above predetermined period of time (S1043) such that the user knows the time for which the user should further wash the wrists after it is determined that the user has started washing between the fingers.

At this time, the hand washing support third notification unit 105 may cause the display 14 to display a message indicating that the part that the user should wash is the user's wrists.

Further, the order of washing between fingers and washing the wrists may be reversed. Accordingly, the order of S1042 and S1043 may be reversed.

Next, a specific example of display time from S1041 to S1043 described above will be described.

Here, it is assumed that the time for which the user rubs the palms until it is determined that the user has started washing hands is three seconds as described above, and the total time required from start to end of hand washing of each part is 30 seconds as described above.

It is also assumed for hand washing of each part that the time required for sufficiently effective hand washing of the user's palms is 10 seconds, the time required for sufficiently effective hand washing between the user's fingers is 10 seconds, and the time required for sufficiently effective hand washing of the user's wrists is 10 seconds.

In this case, the hand washing support first notification unit 103a turns on the display of the display 14 for the remaining seven seconds (=10 seconds−3 seconds) for washing the palms, of the above 10 seconds, which is the time required for sufficiently effective hand washing of the user's palms.

Next, the hand washing support second notification unit 104 turns on the display of the display 14 for the above 10 seconds, which is the time required for sufficiently effective hand washing between the user's fingers.

Finally, the hand washing support third notification unit 105 turns on the display of the display 14 for the above 10 seconds, which is the time required for sufficiently effective hand washing of the user's wrists.

As described above, in the second embodiment of the present invention, the hand washing supporting device notifies for each part of the user's hand the time for which the user should further wash each part of the hands in order for the user to wash each part of the hands sufficiently and effectively. This makes it possible to support a sufficiently effective hand washing by the user more precisely.

The present invention is not limited to the embodiments, and various modifications can be made without departing from the gist of the present invention in an implementing stage. Furthermore, the embodiments may be implemented in combination appropriately as long as it is possible, and in this case, combined effects can be obtained. Further, the above embodiments include inventions on various stages, and various inventions may be extracted by appropriate combinations of the disclosed multiple configuration requirements.

Further, a scheme described in each embodiment can be stored in a recording medium such as a magnetic disk (a Floppy (trade name) disk, a hard disk, or the like), an optical disc (a CD-ROM, a DVD, an MO, or the like), a semiconductor memory (a ROM, a RAM, a Flash memory, or the like) or transferred by a communication medium for distribution, as a program (a software unit) that can be executed by a computing machine (a computer). Note that the program stored on the medium side includes a setting program for configuring, in a computing device, a software means (including not only an execution program but also a table and a data structure) to be executed by the computing device. The computing device which realizes the present information processing apparatus reads the program recorded in the recording medium, optionally builds the software means by the setting program, and executes the above-described processing by controlling the operation with the software means. Note that the recording medium referred to herein is not limited to a recording medium for distribution, but includes a storage medium such as a magnetic disk or a semiconductor memory provided in a computing machine or a device connected via a network.

REFERENCE SIGNS LIST

1 Smart watch
10 CPU
11 RAM
12 Storage
13 Battery
14 Display
15 Triaxial acceleration sensor
20, 20a Hand washing supporting device
100 Sensor value output unit
101 Range determination unit
101b Count value recording unit
102 Hand washing start determination unit
103 Hand washing support notification unit
103a Hand washing support first notification unit
104 Hand washing support second notification unit
105 Hand washing support third notification unit

The invention claimed is:

1. A hand washing supporting device comprising a processor, wherein the processor is configured to perform:
a detection process that detects a motion of a hand by a user;
a determination process that determines, upon detecting the motion of the hand by the user for a predetermined period of time by the detection process, a start of hand washing by the user; and
a notification process that notifies, in accordance with a determination of the start of the hand washing by the determination process, the user of a difference between time required from the start to an end of the hand washing by the user and the predetermined period of time,
wherein the detection process includes detecting accelerations in a plurality of directions representing the motion of the hand by the user,
wherein the determination process includes determining the start of hand washing by the user based on the accelerations in the plurality of directions detected by the detection process satisfying a condition that corresponds to a motion by the user of rubbing palms for the predetermined period of time, and
wherein the plurality of directions include (i) a first direction along a longitudinal direction of the user hand based on a device being attached to a portion of the user hand where a hand washing motion by the user can be detected and (ii) a second direction orthogonal to the first direction, and
wherein the processor is configured in such a manner that:
the detection process includes continuously detecting accelerations in the first and second directions in a time series, wherein the detected acceleration in the second direction is a positive value, and the detected acceleration in the first direction is a value that repeats a change between the positive value and a negative value over time,
the determination process includes determining the start of hand washing by the user based on a relationship between the positive value and the negative value of the acceleration in the first direction satisfying a condition that corresponds to a motion by the user of rubbing palms along the first direction for the predetermined period of time, and
the determination process includes determining, based on a number of times difference between a maximum value at the positive value of the acceleration in the first direction and a minimum value at the negative value of the acceleration in the first direction satisfying a threshold condition that corresponds to the motion by the user of rubbing palms in the predetermined period of time, a relationship between the positive value of the acceleration in the first direction and the negative value of the acceleration in the first direction satisfies the condition corresponding to the motion by the user of rubbing palms for the predetermined period of time.

2. The hand washing supporting device according to claim 1, wherein the processor is configured so that:
the detection process includes detecting accelerations in a plurality of directions representing the motion of the hand by user hand at a predetermined sampling period, and
the determination process includes determining the start of hand washing by the user based on the accelerations in the plurality of directions detected by the detection process for a predetermined number of times at the predetermined sampling period satisfying a condition that corresponds to a motion by the user of rubbing palms for the predetermined period of time.

3. The hand washing supporting device according to claim 1, further comprising a display apparatus, wherein the processor is configured so that the notification process includes causing the display apparatus to display information for prompting the user to wash hands for time corresponding to the difference between the time required from the start to the end of the hand washing by the user and the predetermined period of time.

4. The hand washing supporting device according to claim 1, wherein the processor is configured so that:
the determination process includes determining, upon detecting the motion of the hand by the user for the predetermined period of time by the detection process, a start of hand washing performed by palms of the user; and
the notification process includes notifying, in accordance with a determination of the start of the hand washing by the determination process, the user of the difference between time required from the start to an end of the hand washing by the user of palms and the predetermined period of time, and notifying time required from a start to an end of hand washing of a part different from the palms after completion of the notification.

5. A method of supporting hand washing performed by an apparatus including a processor, the method comprising:
detecting, at the processor, a motion of a hand by a user,
determining, at the processor, upon the processor detecting the motion of the hand by the user for a predetermined period of time, a start of hand washing by the user, and
notifying, at the processor, in accordance with a determination of the start of hand washing at the processor, the user of a difference between time required from the start to an end of the hand washing by the user and the predetermined period of time, wherein detecting the motion of the hand includes detecting accelerations in a plurality of directions representing the motion of the hand by the user, wherein determining the start of hand washing includes determining the start of hand washing by the user based on the accelerations in the plurality of directions detected satisfying a condition that corresponds to a motion by the user of rubbing palms for the predetermined period of time, and wherein the plurality of directions include (i) a first direction along a longitudinal direction of the user hand based on a device being attached to a portion of the user hand where a hand washing motion by the user can be detected and (ii) a second direction orthogonal to the first direction, wherein detecting the motion of the hand by the user includes continuously detecting accelerations in the first and second directions in a time series, wherein the detected acceleration in the second direction is a positive value, and the detected acceleration in the first direction is a value that repeats a change between the positive value and a negative value over time, wherein determining the start of hand washing includes determining the start of hand washing by the user based on a relationship between the positive value and the negative value of the acceleration in the first direction satisfying a condition that corresponds to a motion by the user of rubbing palms along the first direction for the predetermined period of time, and wherein determining the start of hand washing includes determining, based on a number of times difference between a maximum value at the positive value of the acceleration in the first direction and a minimum value at the negative value of the acceleration in the first direction satisfying a threshold condition that corresponds to the motion by the user of rubbing palms in the predetermined period of time, a relationship between the positive value of the acceleration in the first direction and the negative value of the acceleration in the first direction satisfies the condition corresponding to the motion by the user of rubbing palms for the predetermined period of time.

6. A non transitory computer readable storage medium storing a program, wherein execution of the program causes a processor included in a hand washing supporting device to perform operations comprising:

detecting, at the processor, a motion of a hand by a user, determining, at the processor, upon the processor detecting the motion of the hand by the user for a predetermined period of time, a start of hand washing by the user, and notifying, at the processor, in accordance with a determination of the start of hand washing at the processor, the user of a difference between time required from the start to an end of the hand washing by the user and the predetermined period of time, wherein detecting the motion of the hand includes detecting accelerations in a plurality of directions representing the motion of the hand by the user, wherein determining the start of hand washing includes determining the start of hand washing by the user based on the accelerations in the plurality of directions detected satisfying a condition that corresponds to a motion by the user of rubbing palms for the predetermined period of time, and wherein the plurality of directions include (i) a first direction along a longitudinal direction of the user hand based on a device being attached to a portion of the user hand where a hand washing motion by the user can be detected and (ii) a second direction orthogonal to the first direction, wherein detecting the motion of the hand by the user includes continuously detecting accelerations in the first and second directions in a time series, wherein the detected acceleration in the second direction is a positive value, and the detected acceleration in the first direction is a value that repeats a change between the positive value and a negative value over time, wherein determining the start of hand washing includes determining the start of hand washing by the user based on a relationship between the positive value and the negative value of the acceleration in the first direction satisfying a condition that corresponds to a motion by the user of rubbing palms along the first direction for the predetermined period of time, and wherein determining the start of hand washing includes determining, based on a number of times difference between a maximum value at the positive value of the acceleration in the first direction and a minimum value at the negative value of the acceleration in the first direction satisfying a threshold condition that corresponds to the motion by the user of rubbing palms in the predetermined period of time, a relationship between the positive value of the acceleration in the first direction and the negative value of the acceleration in the first direction satisfies the condition corresponding to the motion by the user of rubbing palms for the predetermined period of time.

* * * * *